US007473717B2

(12) United States Patent
Muenz et al.

(10) Patent No.: US 7,473,717 B2
(45) Date of Patent: Jan. 6, 2009

(54) EXPANDABLE EPOXY RESIN-BASED SYSTEMS MODIFIED WITH THERMOPLASTIC POLYMERS

(75) Inventors: Xaver Muenz, Heidelberg (DE); Thomas Leeb, Magstadt (DE); Rajat K. Agarwal, Neckargemmuend (DE); Gregory A. Ferguson, Harrison Township, MI (US); Michael Puckett, Southfield, MI (US)

(73) Assignee: Henkel AG & Co. KGaA (DE)

( * ) Notice: Subject to any disclaimer, the term of this patent is extended or adjusted under 35 U.S.C. 154(b) by 0 days.

(21) Appl. No.: 10/867,427

(22) Filed: Jun. 14, 2004

(65) Prior Publication Data

US 2004/0266899 A1 Dec. 30, 2004

Related U.S. Application Data

(63) Continuation of application No. PCT/EP02/14370, filed on Dec. 17, 2002.

(60) Provisional application No. 60/431,228, filed on Dec. 6, 2002.

(30) Foreign Application Priority Data

Dec. 21, 2001 (DE) ................. 101 63 248
Dec. 21, 2001 (DE) ................. 101 63 253

(51) Int. Cl.
*C08J 9/00* (2006.01)
*C08J 9/32* (2006.01)
(52) U.S. Cl. ................... 521/135; 521/178
(58) Field of Classification Search .......... 521/135, 521/178
See application file for complete search history.

(56) References Cited

U.S. PATENT DOCUMENTS

| 2,965,586 A | 12/1960 | Fisch et al. |
| 3,756,984 A | 9/1973 | Klaren et al. |
| 4,066,625 A | 1/1978 | Bolger |
| 4,199,486 A | 4/1980 | Boessler et al. |
| 4,268,656 A | 5/1981 | Ray-Chaudhuri et al. |
| 4,360,649 A | 11/1982 | Kamio et al. |
| 4,444,818 A | 4/1984 | Tominaga et al. |
| 4,542,202 A | 9/1985 | Takeuchi et al. |
| 4,543,383 A | 9/1985 | Heil et al. |
| 4,546,155 A | 10/1985 | Hirose et al. |
| 4,610,836 A | 9/1986 | Wycech |
| 4,695,343 A | 9/1987 | Wycech |
| 4,732,806 A | 3/1988 | Wycech |
| 4,751,249 A | 6/1988 | Wycech |
| 4,769,391 A | 9/1988 | Wycech |
| 4,861,097 A | 8/1989 | Wycech |
| 4,900,601 A | 2/1990 | Halg et al. |
| 4,901,500 A | 2/1990 | Wycech |
| 4,908,930 A | 3/1990 | Wycech |
| 4,922,596 A | 5/1990 | Wycech |
| 4,923,902 A | 5/1990 | Wycech |
| 4,978,562 A | 12/1990 | Wycech |
| 4,995,545 A | 2/1991 | Wycech |
| 5,124,186 A | 6/1992 | Wycech |
| 5,134,239 A | 7/1992 | Bertram et al. |
| 5,274,006 A * | 12/1993 | Kagoshima et al. ........... 521/85 |
| 5,290,857 A | 3/1994 | Ashida et al. |
| 5,407,978 A | 4/1995 | Bymark et al. |
| 5,430,112 A | 7/1995 | Sakata et al. |
| 5,439,977 A | 8/1995 | Yokota et al. |
| 5,453,453 A | 9/1995 | Lamon et al. |
| 5,464,910 A | 11/1995 | Nakatsuka et al. |
| 5,543,486 A | 8/1996 | Abe et al. |
| 5,548,058 A | 8/1996 | Muroi et al. |
| 5,575,526 A | 11/1996 | Wycech |
| 5,637,179 A | 6/1997 | Nakayama et al. |

(Continued)

FOREIGN PATENT DOCUMENTS

CA  2 005 735  6/1990

(Continued)

OTHER PUBLICATIONS

Patent Abstracts of Japan, vol. 1995, No. 08 for JP 07 088997 (1995).

(Continued)

*Primary Examiner*—Irina S Zemel
(74) *Attorney, Agent, or Firm*—Mary K. Cameron; Stephen D. Harper

(57) ABSTRACT

Expandable thermosettable compositions containing at least one epoxy resin, at least one finely divided thermoplastic polymer powder, at least one blowing agent, at least one curing agent, and at least one filler are suitable for the production of thermosetting laminated bodies with a tacky surface. These laminated bodies can be produced and handled in a simple manner and are suitable for stiffening and reinforcing flat structural components, in particular vehicle body structural components, such as vehicle body frames, doors, trunk lids, engine hoods and/or roof components in automobile construction. The expandable thermosettable compositions are also suitable for the production of thermosetting, thermally expandable shaped articles for reinforcing hollow structural members by the injection molding process. In preferred embodiments, the composition is injected onto a metallic or thermoplastic carrier. These thermally expandable shaped articles are especially useful in the production of automobiles and other vehicles to maintain or increase the strength of structural members such as rockers, pillars, radiator support beams, doors, reinforcing beams, and the like.

25 Claims, No Drawings

U.S. PATENT DOCUMENTS

| | | | |
|---|---|---|---|
| 5,686,509 A | 11/1997 | Nakayama et al. |
| 5,717,011 A | 2/1998 | Griggs et al. |
| 5,733,954 A | 3/1998 | McKenzie et al. |
| 5,755,486 A | 5/1998 | Wycech |
| 5,789,498 A | 8/1998 | Onhishi et al. |
| 5,798,399 A | 8/1998 | Griggs et al. |
| 5,801,218 A | 9/1998 | McKenzie et al. |
| 5,804,608 A | 9/1998 | Nakazato et al. |
| 5,859,096 A | 1/1999 | Hoge et al. |
| 5,884,960 A | 3/1999 | Wycech |
| 5,888,600 A | 3/1999 | Wycech |
| 5,992,923 A | 11/1999 | Wycech |
| 5,996,167 A | 12/1999 | Close |
| 6,003,274 A | 12/1999 | Wycech |
| 6,015,865 A | 1/2000 | Blank et al. |
| 6,040,350 A | 3/2000 | Fukui |
| 6,058,673 A | 5/2000 | Wycech |
| 6,068,424 A | 5/2000 | Wycech |
| 6,079,180 A | 6/2000 | Wycech |
| 6,090,232 A | 7/2000 | Seeliger et al. |
| 6,092,864 A | 7/2000 | Wycech et al. |
| 6,103,784 A | 8/2000 | Hilborn et al. |
| 6,111,015 A | 8/2000 | Eldin et al. |
| 6,180,693 B1 | 1/2001 | Tang et al. |
| 6,218,442 B1 | 4/2001 | Hilborn et al. |
| 6,281,260 B1 | 8/2001 | Hanley, IV et al. |
| 6,323,251 B1 | 11/2001 | Perez et al. |
| 6,333,102 B1 | 12/2001 | Kim et al. |
| 6,348,513 B1 | 2/2002 | Hilborn et al. |
| 6,368,438 B1 | 4/2002 | Chang et al. |
| 6,376,564 B1 | 4/2002 | Harrison |
| 6,387,470 B1 | 5/2002 | Chang et al. |
| 6,403,222 B1 | 6/2002 | Harrison |
| 6,403,668 B1 | 6/2002 | Yoshino |
| 6,573,309 B1 | 6/2003 | Reitenbach et al. |
| 6,776,869 B1 | 8/2004 | Schenkel |
| 6,787,579 B2 | 9/2004 | Czaplicki et al. |
| 6,884,854 B2 | 4/2005 | Schoenfeld et al. |
| 2004/0033344 A1 | 2/2004 | Czaplicki et al. |
| 2004/0076831 A1 | 4/2004 | Hable et al. |
| 2004/0131839 A1 | 7/2004 | Eagle |
| 2005/0022929 A1 | 2/2005 | Schoenfeld et al. |
| 2005/0159511 A1 | 7/2005 | Kramer et al. |

FOREIGN PATENT DOCUMENTS

| | | |
|---|---|---|
| CA | 2 241 073 | 12/1999 |
| DE | 27 22 752 A1 | 11/1978 |
| EP | 0 030 590 B1 | 2/1983 |
| EP | 0 030 999 B1 | 9/1985 |
| EP | 0 230 666 A2 | 8/1987 |
| EP | 0 376 880 A3 | 7/1990 |
| EP | 0 297 036 B1 | 12/1991 |
| EP | 0 500 009 A1 | 8/1992 |
| EP | 0 298 024 B2 | 6/1996 |
| EP | 0 798 062 B1 | 12/2001 |
| JP | 07-088997 | 4/1995 |
| JP | 07-256808 | 10/1995 |
| JP | 09-176358 | 7/1997 |
| JP | 11-158313 | 6/1999 |
| JP | 11-263865 | 9/1999 |
| JP | 2000006287 | 1/2000 |
| JP | 2000-63555 | 2/2000 |
| JP | 2000-239431 | 9/2000 |
| WO | WO 89/08678 A1 | 9/1989 |
| WO | WO 93/00381 A1 | 1/1993 |
| WO | WO93/05103 A1 | 3/1993 |
| WO | WO 95/27000 A1 | 10/1995 |
| WO | WO 96/37400 A1 | 11/1996 |
| WO | WO 98/15594 A1 | 4/1998 |
| WO | WO 98/52997 A1 | 11/1998 |
| WO | WO 00/52086 A2 | 9/2000 |
| WO | WO 01/46290 A1 | 6/2001 |

OTHER PUBLICATIONS

Patent Abstracts of Japan, vol. 2000, No. 04 for JP 2000 006287 (2000).

Patent Abstracts of Japan, vol. 1995, No. 02 for JP 07 256808 (1996).

"Epoxy Resins", 2$^{nd}$ Edition of the Encyclopedia of Polymer Science and Engineering, vol. 6, pp. 322-382 (1986).

Bending Test, DIN 52 293, Beuth Verlag GmbH, Berlin 30, pp. 1-5 (1982).

*Ullmann's Encyclopedia of Industrial Chemistry*; Acrylonitrile-Butadiene-Styrene (ABS) Polymers; Section 5 to 5.13 (37 pages).

*Kirk-Othmer Encyclopedia of Chemical Technology*; "Latex Technology" Sep. 17, 2004; Section 4 to 4.4.2 (9 pages).

* cited by examiner

EXPANDABLE EPOXY RESIN-BASED SYSTEMS MODIFIED WITH THERMOPLASTIC POLYMERS

CROSS-REFERENCE TO RELATED APPLICATIONS

This application is a continuation under 35 USC Sections 365(c) and 120 of International Application No. PCT/EP02/14370, filed 17 Dec. 2002 and published 3 Jul. 2003 in English as WO 03/054069, which claims priority from German Application No. 10163253.3, filed 21 Dec. 2001, German Application No. 10163248.7, filed 21 Dec. 2001, and U.S. Provisional Application No. 60/431,228, filed 6 Dec. 2002, each of which is incorporated herein by reference in its entirety.

FIELD OF THE INVENTION

The present invention is directed to a one-component expandable thermosettable composition that foams and cures at a relatively low temperature (e.g., about 135° C.). The thermosettable composition of the present invention comprises a thermoplastic polymer powder (preferably having a core-shell structure) that helps to promote expansion of the composition when heated.

BACKGROUND OF THE INVENTION

It is known that a number of industries, e.g., the automobile industry, require parts that are both strong and lightweight. One attempt to achieve this balance between strength and minimal weight utilizes hollow parts constructed of relatively thin sheet metal. However, hollow metal parts are easily distorted. Accordingly, it is also known that the presence of structural foam in the cavities of the hollow parts can improve the strength and stiffness of such parts. For flat parts of the automotive body like doors, roofs, trunk lids or hood lids it is known to increase stiffness and rigidity of such parts by bonding sheets ("patches") based on expandable or non expanding epoxy or polyurethane resins onto such parts.

Generally, such foams are either metallic foam materials or are prepared from formulations comprising a thermosettable resin such as an epoxy resin, a blowing agent and fillers and reinforcing agents such as hollow glass microspheres. Preferably, these foams have a density of about 0.30-0.65 g/cm$^3$ (about 20-40 lb/ft$^3$) and are able to withstand heat in excess of 175° C., most preferably in excess of 200° C. Optional ingredients include curatives, processing aids, stabilizers, colorants, and UV absorbers. Where automotive body structural members are reinforced with expandable thermosettable resins, the resins are frequently cured at the bake temperature of the automotive bodies during the paint coating process. However, these bake temperatures are relatively low and the structure of the automotive body can have cool spots that further inhibit the automotive body from attaining the full baking temperature which prevents some thermosettable foams from fully expanding. Additionally, the temperature within a paint bake oven tends to be rather uneven (for example, the temperature near the floor may be significantly lower than the temperature near the ceiling, meaning that thermosettable foam portions located relatively low in a vehicle body may only be exposed to a relatively low temperature). Thus, there is a need for thermosettable compositions that exhibit high degrees of expansion even at low temperatures.

EP-A-0 798 062 proposes structural components of metallic foam material where the metallic foam material is produced from a metal powder and blowing agent and is optionally shaped between massive metallic sheet metal components in a press at high temperatures and under high pressures. Such a process is suitable only for structural components of large size which are produced separately outside the assembly line of a motor vehicle and are then introduced into the normal assembly process. The incorporation and foaming of metallic foam materials is not possible under the process conditions of a normal vehicle assembly line.

U.S. Pat. No. 4,978,562 describes a specifically lightweight, reinforcing door beam of a composite material comprising a metal pipe which is partly filled by a specifically lightweight polymer with a cell structure. It is proposed to mix thermosetting resins based on epoxy resins, vinyl ester resins, unsaturated polyester resins and polyurethane resins with the corresponding curing agents, fillers and cell-forming agents in an extruder, to cure this mixture to a core and to introduce it into the metal pipe such that the core is fixed in the pipe by friction forces or mechanically. Alternatively, the polymer core can be produced by casting from liquid or paste-like polymeric material and pressed into the pipe. Reactive, thermosetting and thermally expanding shaped articles are not disclosed.

U.S. Pat. No. 4,769,391 describes a preshaped composite insert for insertion into a hollow structured body. This insert comprises a large number of thermoplastic granules of a mixture of a thermoplastic resin and non-expanded, expandable hollow microbeads and a matrix of expanded polystyrene which holds the above mentioned granules. The thermoplastic resin of the granules can be a thermoplastic here, such as, for example, a thermoplastic polyester, or it can be a thermosetting epoxy resin. After insertion of the component into the hollow body to be filled, the structural component is heated to a temperature which effects "evaporation" of the expanded polystyrene—evaporation here means breakdown of the expanded polystyrene to a thin film or carbon black. At the same time the thermoplastic granule grains expand and cure, where appropriate, hollow spaces of larger or smaller size remaining between the individual expanded granule particles, depending on the degree of expansion of the granules.

In an analogous manner, U.S. Pat. Nos. 4,861,097 and 4,901,500 describe specifically lightweight composite beams of foamed polymers and metallic structures for reinforcing vehicle doors. According to this doctrine, the polymer core component is first formed by producing a liquid or paste-like reinforcing material, which is then injected or poured into a channel-like structure and subsequently cured. Thereafter, this cured core component is introduced into the metallic hollow body structure. Alternatively, the core can be preshaped or precast by injection molding and then inserted into the hollow space.

WO 89/08678 describes a process and compositions for reinforcing structural elements, the polymeric reinforcing material being a two-component epoxy system in which the one component is a dough-like composition based on epoxy resins and the second component is a mixture of fillers, a colored pigment and a liquid curing agent of dough-like consistency. Directly before the hollow structure is filled with the reinforcing material, the two components are mixed and are introduced into the hollow body structure and cured, it being possible for the hollow body structure optionally to be preheated.

WO 96/37400 describes a W-shaped reinforcing structure which comprises a thermally expandable, resinous material and is introduced, before curing, into the hollow body to be reinforced. The reinforcing polymeric matrix preferably comprises a one-component, dough-like system comprising an epoxy resin, an acrylonitrile/butadiene rubber, fillers, high-strength glass beads, a curing agent and an accelerator and a blowing agent based on an azo compound or a hydrazide compound.

WO 98/15594 describes foamed products for uses in the automobile industry which are based on preferably liquid, two-component epoxy systems in which the one component comprises a liquid epoxy resin and metal carbonates or bicarbonates and the other component comprises pigments, optionally hollow beads and phosphoric acid. When the two components are mixed, these compositions cure with foaming. Uses for reinforcing or stiffening hollow structures are not disclosed.

The polymeric materials of the above mentioned references are either not suitable for the production of preshaped moldings which expand thermally by heating at a later point in time and are thereby thermosetting, or, if they are suitable for this, they as a rule have a very tacky surface which leads to contamination of storage areas, and on the other hand binds dust and dirt. Moreover, a tacky surface of these moldings impedes handling and in particular storage, e.g., stacking of several components on top of one another. For this reason, moldings of the references are provided with a protective film which is removed immediately before use. However, such protective films make the production and use of such moldings more expensive, and in addition the protective film must be disposed of after removal, which causes additional costs.

To reduce the surface tackiness of such moldings, WO00/52086 proposes production of thermosetting, thermally expandable shaped articles from a mixture comprising at least one solid reactive resin, at least one liquid reactive resin, at least one reactive resin having a flexibilizing action and curing agents and/or accelerators or blowing agents. These shaped articles are suitable for stiffening and/or reinforcing thin-walled metal constructions and for stiffening hollow metallic lightweight constructions. Compared with known thermosetting, thermally expandable shaped articles, the shaped articles according to the doctrine of this specification are distinguished by improved dimensional stability in the non-cured state and by a low surface tackiness. The properties of processability and dimensional stability are achieved by mixing of epoxy resins of different melting point. Nevertheless, for example, the reduced surface tackiness can still be achieved only in a temperature interval of very narrow limits, so that a formulation which is indeed non-tacky in winter has a very tacky surface in summer. Furthermore, this procedure requires the use of large amounts of expensive resins and curing systems. For inexpensive production of such expandable shaped articles by the injection molding process in particular, difficulties occur again and again in production and handling, which is undesirable for process reliability of the production process.

U.S. Pat. No. 4,444,818 thus describes a thermosetting adhesive laminated body which is built up from a thermosetting resin layer in the form of a "prepreg" and in which a reinforcing material is embedded. This specification furthermore proposes attachment to one side of the prepreg of a flattened tubular material which can resume its original tubular shape when the reinforcing laminated body is heated. The prepreg laminated body can comprise two different thermosetting resin layers. Epoxy resins are proposed as binders for the thermosetting layers of the prepreg. The tubular or hose-like body here is said to be made of polyethylene, ethylene/vinyl acetate copolymers, polypropylene, polystyrene or PVC or also nitrile rubber. The production process for such reinforcing laminated bodies is expensive.

EP-A-230666 describes a process for the production of a one-component thermosetting composition which forms a urethane-epoxy-silicone interpenetrating network (IPN) system on heating. This specification proposes production, from these compositions, of metal-reinforcing laminated bodies ("patches") which adhere directly to oil-containing metal surfaces, such as oily steel sheets. The IPN is said to be formed here by a polyepoxy compound, a blocked polyamine curing agent and a chain-lengthened polyurethane prepolymer in which some isocyanate groups of the prepolymer are blocked with a hydroxy-functional polysiloxane.

EP-A-297036 describes a laminated body comprising a support, e.g., resin-bonded glass fiber fabric, to which a layer of thermosetting resin is applied. To protect the tacky resin surface, a cover film of a material which shrinks under the action of heat is envisaged. This film should be provided with slits which widen to open after a heat pretreatment, so that part of the tacky surface is exposed. By this means it is said to be no longer necessary to peel off the protective film before application of the laminated body. No information is given regarding the composition of the tacky resin layer.

EP-A-376880 describes a laminated body arrangement for stiffening planar bodies comprising a carrier layer of a curable synthetic resin material in which a reinforcing material bonded thereto or embedded therein is provided. An adhesive layer which comprises a curable synthetic resin material optionally provided with fillers and other additives and is applied to the carrier layer and faces the body to be stiffened is furthermore provided. To achieve the highest possible reinforcing effect without deformation of the planar body (metal sheet), the adhesive layer should have a higher elasticity modulus after curing of the synthetic resin than the cured synthetic resin material of the carrier layer, and at the same time the carrier layer and adhesive layer in the cured state should have at least approximately the same coefficient of thermal expansion as the planar body to be stiffened. The carrier layer here should comprise a glass fiber fabric and a mixture of liquid epoxy resins and solid epoxy resins and curing agents, and the adhesive layer should substantially comprise thermosetting, self-adhesive synthetic resins and is likewise built up from liquid and solid epoxy resins as well as curing agents and fillers.

EP-A-298024 similarly describes a process for stiffening metal sheets and shaped articles of plastic with the aid of a single- or multi-layered planar stiffening body in which at least one layer comprises a synthetic resin which cures under the influence of heat. This stiffening body here should initially be subjected to a first heat treatment, during which at least one surface of the stiffening body becomes tacky as a result of this first heat treatment. The stiffening body should then be applied with the tacky surface to the element to be stiffened and the stiffening body should then be subjected to a second heat treatment, until all the layers of the stiffening body have cured. It is proposed that a layer of the reinforcing body is built up from thermosetting epoxy resins and optionally comprises glass fiber fabric. An epoxide-based hot-melt adhesive, possibly based on polyurethane or copolyester, is proposed as the second layer which should become tacky during the first heat treatment. Alternatively, this layer should comprise a film which shrinks under the action of heat, so that a tacky layer is exposed after shrinkage.

WO 95/27000 describes a curable, injection-moldable composition for reinforcing thin, hard sheets of metal or plates. The composition is built up from thermosetting resins, expandable hollow microbeads and particulate reinforcing material of ground glass fibers, ground carbon fibers and mixtures thereof. The various epoxy resins based on glycidyl ethers, glycidyl esters or glycidylamines are proposed as the thermosetting resin compositions.

CA-A-2241073 describes a film-reinforcing stiffening laminate for rigid, thin-walled substrates. According to the doctrine of this specification, the polymer should cure with expansion in a lacquering oven and thereby bond intimately with the inner surface of the base substrate to be reinforced. No information regarding the binder composition is given in this specification.

As can be seen from the references described above, the sheet- or frame-reinforcing laminated bodies are substantially limited to epoxy-based systems and systems based on polyurethanes. These indeed as a rule affect the required stiffening performance, but do not meet the demand for a chemical basis which is industrially hygienic and acceptable in health terms. Reactive polyurethane systems as a general rule still comprise residues of monomeric diisocyanates. For this reason workplaces must be appropriately equipped with exhaust equipment where such compositions are used in order to be able to protect persons employed at these workplaces from exposure to isocyanates. In the case of epoxy-based systems, the dimensional stability of the components is determined by the composition of the epoxy resin mixture. The adjustment of the hardness of the laminated body in the non-cured state is determined via the nature and relative contents of the solid, semi-solid and liquid epoxy resins. The (desired) tackiness on oiled metal sheets and the resistance to washing out by the various process liquids during vehicle body production is also determined by these. High contents of low molecular weight liquid epoxy resins have hitherto been required for tacky laminated body compositions. As is known, these liquid epoxy resins comprise low molecular weight epoxide compounds with a molecular weight of less than 700. The use of such epoxy compositions is undesirable for industrial hygiene reasons, since these low molecular weight epoxide compounds can cause allergic or sensitizing reactions in contact with skin. Such non-cured laminated bodies with a high content of liquid epoxies moreover indeed have a good adhesion to the substrates to be stiffened, but they are not very resistant to the process liquids, such as washing and cleaning baths, phosphating and conversion baths and the electro-dip lacquer, and in particular the wash liquids are applied under a high pressure and at temperatures of up to 75° C. Furthermore, such laminated bodies are very flexible and therefore not very dimensionally stable and can be stacked only with expensive specific packaging.

There is thus a need for expandable resin based compositions suitable for increasing strength and stiffness for hollow parts or stiffness and rigidity for flat parts.

SUMMARY OF THE INVENTION

One object of the present invention is to provide non-tacky moldings for reinforcing and/or stiffening metal sheets or metallic hollow bodies, which
- are thermosetting;
- are thermally expandable;
- have a good stiffening and/or reinforcing action for thin-walled metallic structures;
- can be cast in the injection molding process at low temperatures, preferably onto a carrier;
- are dimensionally stable up to 50° C. after the injection molding;
- can be transported without expensive packaging; and/or
- are inexpensive and easy to produce both as a composition and as a molding.

Another object of the present invention comprises the provision of multi-layered, flat laminated bodies built up from at least one thermosetting binder layer and at least one layer of reinforcing agents, the binder layer comprising at least one liquid reactive epoxy resin in a minor amount, optionally a flexibilizing agent, optionally a reactive diluent, at least one finely divided thermoplastic polymer powder, curing agent and/or accelerator and optionally blowing agent. "Flat bodies" or "flat structural components" in the context of this application includes not only completely planar structures but also structures of vehicles which include slightly curved or bent portions as in doors, roof parts, trunk lids, hood lids and the like.

In another embodiment, the present invention provides a low temperature cure one-component expandable thermosettable composition. The composition preferably expands to at least about 190 percent of its initial volume (i.e., exhibits an expansion of at least about 90 percent as compared to the initial volume) and cures at temperatures as low as about 135° C. The one-component expandable thermosettable composition contains an epoxy resin and employs a thermoplastic polymer powder (most preferably an acrylic powder, particularly one having a core-shell structure) to facilitate or enhance the desired expansion while the composition is curing. The inventors have unexpectedly found that the addition of thermoplastic polymer powder provides novel properties to the composition and the resulting thermoset foam according to the present invention.

Additionally, the thermosettable composition of the present invention does not require the production of a special intermediate for incorporation into the thermosettable composition. The thermosettable composition of the present invention also has increased hardness compared to the prior art, which improves the handling ability of the composition. The tack of the thermosettable composition can be varied depending on the requirements of the application. Further, the increased hardness enables the production of the unexpanded thermosettable composition as a powder, pellet, or other shape that is non-blocking.

When the thermosettable composition of the present invention is used to reinforce or fill structural members, such as those found in automobiles, the resulting foamed thermoset has both high strength and low weight compared to the prior art. In such applications, the thermosettable composition of the present invention enables designers to reduce the weight of parts while maintaining stiffness and structural strength.

The expandable thermosettable composition of the present invention can be designed or formulated to be "dimensionally stable", meaning that a part shaped or molded from the resin is tack free and maintains the desired shape at normal handling conditions. The resin thus can be produced in a free-flowing powder or pelletized form or can be formed into a block, ribbon, tape, cylinder, or other such shape.

The thermally expandable shaped articles are preferably produced by an injection molding process under low pressures and at low temperatures.

The present invention also provides a process for stiffening and/or reinforcing vehicle body structural components which comprises the following process steps.

In a first stage the above-mentioned binder constituents are mixed homogeneously at temperatures below 110° C. and the mixture is then transferred to an injection molding unit. This binder is injected there into an injection mold at temperatures of from 60° C. to 110° C., preferably at temperatures of from 70° C. to 90° C., under temperature-controlled conditions. This mold optionally contains a carrier of metal or thermoplastic materials onto which the expandable binder is injected. The molding is then cooled to temperatures of below 50° C., and on release from the mold the surface of the expandable binder is non-tacky, so that the expandable shaped articles can be packed without particular expenditure and even in summer withstand long transportations into southern countries without problems, without the use of refrigerated trucks being necessary.

For the end use, the expandable molding is introduced and fixed on to the planar metallic substrate or into the hollow space to be stiffened, for example a vehicle body. During the subsequent process heats of the lacquering ovens, the vehicle body is known to be brought to temperatures of between 110° C. and 200° C., and during this heating the volume of the shaped article expands by 50 to 300% and the reactive resin matrix cures to a thermoset.

The present invention thus also provides the use of the expandable shaped articles for stiffening and reinforcing planar metal sheet components and/or metallic hollow structures, in particular vehicle body hollow components, such as vehicle body frames, vehicle body supports, vehicle body columns and wider joints and gaps between vehicle body components in automobile construction.

The present invention also provides a process for stiffening or for reinforcing planar structural components of metal or plastic which comprises the following process steps:
a) mixing of the binder constituents at temperatures below 110° C.,
b) extrusion of the binder at temperatures from 60° C. to 110° C., preferably 70° C. to 90° C., optionally on a textile sheet-like structure or metal tape,
c) optionally application of a protective film to the binder layer.

The laminated bodies produced in this way can optionally be intermediately stored or transported to the final user (as a general rule an automobile producer). The protective film optionally present is removed there from the binder layer, the laminated body is then applied to the structural component to be reinforced or to be stiffened and curing of the binder is carried out at temperatures of between 110° C. and 210° C., preferably between 130° C. and 180° C., in the lacquer drying ovens, as a general rule in the oven for curing the electro-dip lacquer coating.

DETAILED DESCRIPTION OF CERTAIN EMBODIMENTS OF THE INVENTION

The expandable thermosettable composition of the present invention comprises:
(a) at least one epoxy resin;
(b) at least one finely divided thermoplastic polymer powder, preferably an acrylic resin having a core-shell structure;
(c) at least one blowing agent, either a chemical blowing agent or a physical blowing agent;
(d) optionally at least one blowing agent activator/accelerator;
(e) at least one curative, preferably including at least one amine-epoxy adduct;
(f) at least one filler, preferably including hollow glass microspheres and/or hollow beads of plastic;
(g) optionally at least one rubber or other flexibilizing agent;
(h) optionally at least one reactive diluent, and
(i) optionally at least one coupling agent.

Any of the thermosettable resins having an average of more than one (preferably, two or more) epoxy groups per molecule known or referred to in the art may be utilized as the epoxy resin component of the present invention. The epoxide equivalent of these polyepoxides can vary between 150 and 50,000, preferably between 170 and 5,000. Epoxy resins are described, for example, in the chapter entitled "Epoxy Resins" in the Second Edition of the *Encyclopedia of Polymer Science and Engineering*, Volume 6, pp. 322-382 (1986). The polyepoxides can in principle be saturated, unsaturated, cyclic or acyclic, aliphatic, alicyclic, aromatic or heterocyclic polyepoxide compounds. Examples of suitable polyepoxides include the polyglycidyl ethers, which are prepared by reaction of epichlorohydrin or epibromohydrin or a polyphenol in the presence of alkali. Polyphenols which are suitable for this are, for example, resorcinol, pyrocatechol, hydroquinone, bisphenol A (bis-(4-hydroxy-phenyl)-2,2-propane), bisphenol F (bis(4-hydroxyphenyl)methane), bis(4-hydroxyphenyl)-1,1-isobutane, 4,4'-dihydroxybenzophenone, bis(4-hydroxyphenyl)-1,1-ethane and 1,5-hydroxynaphthalene. Further suitable polyphenols as a basis for the polyglycidyl ethers are the known condensation products of phenol and formaldehyde or acetaldehyde of the novolac resin type.

Further polyepoxides are polyglycidyl esters of polycarboxylic acids or hydroxycarboxylic acids, for example reaction products of glycidol or epichlorohydrin with aliphatic or aromatic polycarboxylic acids, such as oxalic acid, succinic acid, glutaric acid, phthalic acid, tetrahydrophthalic acid, terephthalic acid, dimer fatty acid, p-hydroxybenzoic acid or beta-hydroxy naphthoic acid.

Further epoxides are derived from the epoxidation products of olefinically unsaturated cycloaliphatic compounds or from naturally occurring oils and fats or synthetic polyolefins. Other suitable polyepoxides include glycidylated aminoalcohol compounds and aminophenol compounds, hydantoin diepoxides and urethane-modified epoxy resins.

Mixtures of epoxy resins may be used if so desired; for example, mixtures of liquid (at room temperature), semi-solid, and/or solid epoxy resins can be employed. Any of the epoxy resins available from commercial sources are suitable for use in the present invention. The epoxy resin or resins should be selected so as to provide the desired combination of properties in both the expandable thermosettable composition and the final cured foam.

The epoxy resins which are derived by reaction of bisphenol A or bisphenol F and epichlorohydrin are very particularly preferred, the liquid epoxy resins preferably being based on bisphenol A and having a sufficiently low molecular weight. The epoxy resins, which are liquid at room temperature, as a rule have an epoxide equivalent weight of 150 to about 480, and an epoxide equivalent weight range of 182 to 350 is particularly preferred.

Epoxy resins which have a flexibilizing action, such as the adducts known per se of carboxyl-terminated butadiene/acrylonitrile copolymers (CTBN) and liquid epoxy resins based on the diglycidyl ether of bisphenol A, can be employed as flexibilizing agents. Specific examples are the reaction products of Hycar CTBN 1300×8, 1300×13 or 1300×15 from B.F. Goodrich with liquid epoxy resins. The reaction products of amino-terminated polyalkylene glycols (such as those sold under the brand name JEFFAMINE by the Hunstsman Chemical Company) with an excess of liquid polyepoxides can furthermore also be employed. Such reaction products are disclosed, for example, in WO 93/00381. Reaction products of mercapto-functional prepolymers or liquid polysulfide polymers with an excess of polyepoxides can in principle also be employed according to the invention as flexibilizing epoxy resins. However, the reaction products of polymeric fatty acids, in particular of dimer fatty acid, with epichlorohydrin, glycidol or, in particular, the diglycidyl ether of bisphenol A (DGBA) are very particularly preferred. The copolymers of acrylonitrile with butadiene and/or isoprene and optionally (meth)acrylic acid with an acrylonitrile content of between 10 and 50 wt. %, preferably between 20 and 40 wt. %, and a (meth)acrylic acid content of between 0.0 and 1 wt. %, preferably between 0.0 and 0.1 wt. %, are furthermore suitable as flexibilizing agents. Mixtures of the above-mentioned flexibilizing agents can also be employed.

In addition to, or instead of the above mentioned reactive flexibilizing agents, it can be particularly advantageous to include or more rubbers in the thermosettable composition, as such additives will toughen the thermoset foam and reduce the tendency of the thermoset foam to crack under stress. As used herein, the term "rubbers" includes both rubbers and elastomers. Suitable rubbers include thermoplastic as well as thermosettable (reactive) rubbers. Illustrative types of rubber include styrene-butadiene rubbers (SBR), nitrile-butadiene rubbers, butyl rubbers, polyisoprene, natural rubber, polybutadiene, chlorobutyl rubbers (neoprene), isobutylene polymers, alpha-olefin elastomers, ethylene-propylene elastomers, chlorosulfonated polyethylenes, ethylene-propylene-diene (EPDM) rubbers, ethylene-vinyl acetate rubbers, halogenated rubbers, hydrogenated natural rubbers, and the like. Thermoplastic block copolymers are one particularly preferred class of rubbers for use in the present invention. Such materials contain one or more base segments ("A") covalently bonded to one or more soft or elastomeric segments ("B"). The A segments may be polystyrene, poly (alpha-methylstyrene), polyethylene, polyurethane, polysulfone, polyester, polycarbonate or the like. The B segments may be polybutadiene, polyisoprene, poly (ethylene-co butylene), polydimethylsiloxane, polyether, or the like. The block copolymers may have a linear, branched, radial or star structure and may, for example, correspond to the general structure A-B-A, (A-B)$_n$, and so forth. SIS, SEBS and SBS block copolymers are examples of specific types of such materials. Liquid rubbers such as butadiene-acrylonitrile copolymers, which may be functionalized with carboxy groups, amine groups, or other groups capable of reacting with other components of the thermosettable composition, may also be employed.

Reactive diluents are another constituent of the binder composition according to one embodiment of the invention. Reactive diluents in the context of this invention are low-viscosity substances which contain epoxide groups (glycidyl ethers or glycidyl esters) and have an aliphatic or aromatic structure. These reactive diluents on the one hand serve to lower the viscosity of the binder system above the softening point, and on the other hand they control the pregelling process in injection molding. Typical examples of reactive diluents which can be employed according to the invention are mono-, di- or triglycidyl ethers of $C_6$- to $C_{14}$-monoalcohols or alkylphenols and the monoglycidyl ethers of cashew nut shell oil, diglycidyl ethers of ethylene glycol, diethylene glycol, triethylene glycol, tetraethylene glycol, 1,2-propylene glycol, 1,4-butylene glycol, 1,5-pentanediol, 1,6-hexanediol or cyclohexanedimethanol, triglycidyl ethers of trimethylolpropane and the glycidyl esters of $C_6$- to $C_{24}$-carboxylic acids or mixtures thereof.

Optionally, at least one diluent is a heat transfer fluid; more preferably a heat transfer fluid derived from an aromatic oil, a glycol oil, a petroleum oil, a fluorocarbon oil, and/or a silicone oil; and most preferably a heat transfer fluid with oxidative stability. Preferred heat transfer fluids include MARLOTHERM LH, MARLOTHERM N, MARLOTHERM P1, MARLOTHERM P2, MARLOTHERM SH, and MARLOTHERM X from Sasol North America Inc.

The thermosettable composition of the present invention further comprises at least one thermoplastic polymer powder.

The thermoplastic polymer powder can in principle be chosen from a large number of polymer powders, examples of which include but are not limited to, homopolymers and copolymers of unsaturated carboxylic acids and unsaturated carboxylic acid esters such as C1 to C6 alkyl esters of acrylic acid and methacrylic acid (often generically referred to in the art as acrylic resins), vinyl acetate homopolymers, vinyl acetate copolymers, ethylene/vinyl acetate copolymers, vinyl chloride homopolymers (PVC) or copolymers of vinyl chloride with vinyl acetate and/or (meth)acrylates, styrene homo- or copolymers or polyvinylbutyral. Particularly preferred thermoplastic polymers contain functional groups, such as carboxyl groups, carboxylate groups, carboxylic acid anhydride groups or imidazole groups. The thermoplastic polymer powders should have an average particle size of less than 1 mm, preferably less than 350 µm, and very particularly preferably less than 100 µm. Preferably, the thermoplastic polymer powder has a glass transition temperature of from about 70 degrees C. to about 120 degrees C., more preferably, from about 80 degrees C. to about 110 degrees C.

Preferably, the thermoplastic polymer powder has a core-shell structure. For example, the core may be comprised of one type of thermoplastic containing reactive functional groups (e.g., carboxyl, carboxylic acid anhydride, or imidazole groups) while the shell may be comprised of a second type of thermoplastic which is non-reactive. It has been unexpectedly been discovered that a thermoplastic polymer powder having a core-shell morphology may help to promote a higher degree of expansion as compared to the use of a comparable amount of a thermoplastic polymer powder having a composition corresponding to that of the core alone. This effect is particularly pronounced when using a latent chemical blowing agent (i.e., a blowing agent that decomposes and releases a volatile gas when heated). Without wishing to be bound by theory, it is believed that the increased expansion is due primarily to a more efficient entrapment of the gases evolved upon decomposition or volatilization of the blowing agent upon heating of the expandable resin formulation. Such core-shell thermoplastic polymer powders are well-known in the art and are typically provided in the form of spray-dried emulsions. See, for example, EP 30999, EP 30590, DE 2722752 and U.S. Pat. No. 5,290,857, each of which is incorporated herein by reference in its entirety. The core-shell thermoplastic polymer powder may be composed of a core comprising an acrylate polymer or a methacrylate polymer having a glass transition temperature of –30° C. or lower and a shell comprising an acrylate polymer or a methacrylate polymer having a glass transition temperature of 70° C. or higher, as disclosed in U.S. Pat. No. 5,290,857. Suitable core-shell thermoplastic polymer powders are available from commercial sources such as, for example, certain of the materials sold under the DEGALAN name by Roehm GmbH or Roehm America, Inc. DEGALAN 4899F, which is reported to have a glass transition temperature of about 95° C. is a particularly preferred polymethacrylate-based core-shell thermoplastic polymer powder suitable for use in the present invention.

All known blowing agents, such as, e.g., the "chemical blowing agents" which liberate gases by decomposition or "physical blowing agents", i.e. expanding hollow beads, are in principle suitable as the blowing agent. Selection of the blowing agent system to be employed is critical to the attainment of an expandable thermosettable composition which is stable when stored over prolonged periods of time at a temperature of about room temperature (e.g., 15 to 40 degrees C.) but capable of undergoing relatively rapid foaming when heated to a moderately elevated temperature (e.g., 130 to 140 degrees C.). The use of chemical blowing agents having decomposition temperatures within the range of from about 120 to about 150 degrees C. is especially preferred, particularly in combination with thermoplastic polymer particles having a core-shell structure. Expandable thermosettable compositions containing chemical blowing agents typically provide thermoset foams having better adhesion to oily metal surfaces as compared to thermoset foams produced using physical blowing agents such as expandable microspheres. In one desirable embodiment of the invention, azodicarbonamide (also sometimes referred to as 1,1'-azobisformamide, AZDC, or ADC) comprises at least part of the blowing agent system. Preferably, the blowing agent system is predominantly (i.e., greater than 50 percent by weight) azodicarbonamide. Even more preferably, at least 80% by weight of the total amount of the blowing agent system is azodicarbonamide. Blowing agents such as sulfonyl hydrazides may be used as minor components of the blowing agent system. In one embodiment, however, azodicarbonamide is essentially the only blowing agent present in the expandable thermosettable composition. Azodicarbonamide is available from a number of commercial sources; for example, it is sold under the trademark UNICELL by Dong Jin Chemical of South Korea and under the CELOGEN trademark by Uniroyal Chemical. The particle size of the azodicarbonamide may be adjusted so as to provide the desired foaming characteristics in the foamable composition. For example, it has been found that relatively small particle size azodicarbonamides tend to produce foams having more uniform cell structure than coarser grade azodicarbonamides. "Activated" or "modified" forms of azodicarbonamide may be used to advantage in the present invention.

Expandable thermoplastic resin microspheres (which can comprise, for example, volatile physical blowing agents such as hydrocarbons or halocarbons encapsulated in thermoplastic shells) may also be employed to render the resin foamable. The thermoplastic shells may be comprised of acrylic-type resins such as polymethylmethacrylate, acrylic-modified polystyrene, polyvinylidene chloride, styrene/MMA copolymers and the like. Particularly preferred expandable microspheres are available from Akzo Nobel AB under the trademark EXPANCEL or from from Pierce & Stevens under the trademark DUALITE.

In some formulations, it may be desirable to also utilize a blowing agent activator or accelerator so as to lower the temperature at which release of the gas from the blowing agent takes place or to increase the rate at which gas is released at a given cure temperature. Typically, from about 0.1% to about 5% blowing agent accelerator/activator based on the weight of the thermosettable composition is employed, although the optimum amount will of course vary depending upon the activator/accelerator selected, the amount of blowing agent, cure temperature and other variables. Excess activator/accelerator should not be present in the thermosettable composition, however, since the storage stability may be undesirably compromised. Suitable blowing agent activators/accelerators include, but are not limited to, ureas (such as the surface-coated oil-treated urea sold by Uniroyal Chemical under the trademark BIK OT), polyols, organic acids, amines, and lead, zinc, tin, calcium and cadmium oxides and salts (including carboxylic acid salts).

Any of the latent (heat-activated) curatives known in the epoxy resin art may be used in the present invention, examples for such curatives are guanidines, substituted guanidines, substituted ureas, melamine resins, guanamine derivatives, cyclic tertiary amines, aromatic amines and/or mixtures thereof. It is preferred for at least one curative to be an amine-epoxy adduct. Amine-epoxy adducts are well-known in the art and are described, for example, in U.S. Pat. Nos. 3,756,984, 4,066,625, 4,268,656, 4,360,649, 4,542,202, 4,546,155, 5,134,239, 5,407,978, 5,543,486, 5,548,058, 5,430,112, 5,464,910, 5,439,977, 5,717,011, 5,733,954, 5,789,498, 5,798,399 and 5,801,218, each of which is incorporated herein by reference in its entirety. Such amine-epoxy adducts are the products of the reaction between one or more amine compounds and one or more epoxy compounds. Carboxylic acid anhydrides, carboxylic acids, phenolic novolac resins, water, metal salts and the like may also be utilized as additional reactants in the preparation of the amine-epoxy adduct or to further modify the adduct once the amine and epoxy have been reacted. Preferably, the adduct is a solid which is insoluble in the epoxy resin component of the present invention at room temperature, but which becomes soluble and functions as an accelerator to increase the cure rate upon heating. While any type of amine could be used (with heterocyclic amines and/or amines containing at least one secondary nitrogen atom being preferred), imidazole compounds are particularly preferred. Illustrative imidazoles include 2-methyl imidazole, 2,4-dimethyl imidazole, 2-ethyl-4-methyl imidazole, 2-phenyl imidazole and the like. Other suitable amines include, but are not limited to, piperazines, piperidines, pyrazoles, purines, and triazoles. Any kind of epoxy compound can be employed as the other starting material for the adduct, including monofunctional, bifunctional, and polyfunctional epoxy compounds such as those described previously with regard to the epoxy resin component. Suitable amine-epoxy adducts are available from commercial sources such as Ajinomoto, Inc., Shell, Pacific Anchor Chemical Company, and the Asahi Chemical Industry Company Limited. The products sold by Ajinomoto under the trademark AJICURE and by Air Products under the trademark ANCAMINE are especially preferred for use in the present invention.

The curing of the epoxy resin(s) utilized in the present invention may be additionally assisted by the incorporation of other substances capable of promoting the desired hardening upon heating. Such materials are referred to herein as "curatives", but also include the materials referred to by workers in the field as curing agents, hardeners, accelerators, activators, and catalysts. While certain curatives promote epoxy resin curing by catalytic action, others participate directly in the reaction of the resin and become incorporated into the thermoset polymeric network which is formed. Although any of the curatives (curing agents) known in the epoxy resin field (see the chapter in the Encyclopedia of Polymer Science and Engineering referenced hereinabove) may be used in the present invention in addition to the amine-epoxy adduct, the use of one or more nitrogen-containing compounds such as imidazoles, substituted ureas such as p-chlorophenyl-N,N-dimethylurea (monuron), 3-phenyl-1,1-dimethylurea (fenuron) or 3,4-dichlorophenyl-N,N-dimethylurea (diuron), amino compounds like tertiary aryl- or alkylamines, such as, for example, benzyldimethylamine, tris(dimethylamino)phenol, piperidine or piperidine derivatives, amine salts, and quaternary ammonium compounds as the auxiliary curative(s) is desirable (provided that such compounds which cause an unacceptably high degree of epoxy resin reaction under normal storage conditions are avoided). Dicyandiamide (sold commercially by Air Products under the trademark "AMICURE CG") is a particularly preferred auxiliary curative, although other guanidine compounds may also be utilized. In one desirable embodiment of the invention, dicyandiamide (preferably, about 0.5-8 wt. % based on the total weight of the thermosettable composition) is used in combination with an amine-epoxy adduct (preferably, about 0.1-5 wt. %) in the curative system. The curative system must, however, be selected such that it does not catalyze curing of the thermosettable composition to any significant extent under typical storage conditions over an extended period. Preferably, the amounts and identities of the components of the curative system are selected such that the thermosettable composition remains stable for at least two weeks in storage at 54° C. (130° F.) without a significant loss in cured foam properties and does not expand in volume or decrease in specific gravity to an unacceptable extent under such conditions, but foams and cures within about 10 minutes upon being heated at about 135° C.

As a rule, the binders according to the invention furthermore comprise fillers which are known per se, such as, for example, the various ground or precipitated chalks, carbon black, calcium-magnesium carbonates, barite and, in particular, silicatic fillers of the aluminum-magnesium-calcium silicate type, e.g., wollastonite and chlorite.

It will be especially desirable to include one or more glass fillers in the thermosettable composition, as such fillers have been found to impart useful characteristics to the resulting foam (especially where it is to be used to reinforce a structural member). For example, hollow glass microspheres may be added to reduce the density of the foam, and thus the overall weight of the reinforced structural member, while maintaining good stiffness and tensile strength and high compressive strength. Commercially available hollow glass microspheres (sometimes also referred to as glass microballoons or microbubbles) include the materials sold by Minnesota Mining and Manufacturing under the trademark SCOTCHLITE, with suitable grades including those sold under the designations B38, C15, K20 and VS 5500. The glass microspheres preferably have diameters in the range of from about 5 to about 200 micrometers (more preferably, less than about 70 micrometers). The crush strength of the hollow glass microspheres may be selected in accordance with the desired characteristics of the cured thermoset foam or reinforced structural member containing said foam. Microspheres having a crush strength in excess of 500 psi are typically employed, however. In a particularly desirable embodiment, hollow glass microspheres comprise from about 5 to about 50 percent by weight of the thermosettable composition. Glass fiber is another preferred type of glass filler, since it helps increase the strength and stiffness of the resulting foam. The glass fiber may be chopped, milled or in other physical forms.

Other types of fillers may also be optionally present in the thermosettable composition. Any of the conventional inorganic or organic fillers known in the thermosettable resin art may be used including, for example, silica (including fumed or pyrogenic silica, which may also function as a thixotropic or rheological control agent), calcium carbonate (including coated and/or precipitated calcium carbonate, which may also act as thixotropic or rheological control agent, especially when it is in the form of fine particles), fibers other than glass fibers (e.g., wollastonite fibers, carbon fibers, ceramic fibers, aramid fibers), alumina, clays, sand, metals (e.g., aluminum powder, hollow steel beads), microspheres other than glass microspheres (including thermoplastic resin such as hollow beads based on phenolic resins, epoxy resins or polyesters, expanded hollow microbeads with a wall material of (meth) acrylic acid ester copolymers, polystyrene, styrene/(meth) acrylate copolymers and, in particular of polyvinylidene chloride and copolymers of vinylidene chloride with acrylonitrile and/or (meth)acrylic acid esters, ceramic and carbon microspheres, which may be solid or hollow, expanded or expandable), and any of the other organic or inorganic fillers, e.g. fly ash (Fillite), known in the epoxy resin field. Organic fillers may also include those lightweight fillers of natural origin, such as ground nut shells, for example the shells of cashew nuts, coconuts or groundnut shells, cork flour or powdered coke.

In one particularly preferred embodiment the compositions for the thermosetting, thermally expandable shaped articles additionally comprise fibers based on aramid fibers, carbon fibers, metal fibers—e.g., of aluminum—, glass fibers, polyamide fibers, polyethylene fibers or polyester fibers, these fibers preferably being pulp fibers or staple fibers which have a fiber length of between 0.5 and 6 mm and a diameter of 5 to 20 μm. Polyamide fibers of the aramid fiber type or also polyester fibers are particularly preferred here.

To further improve the corrosion resistance of composites containing the thermoset foams of this invention, the thermosettable composition may additionally include one or more coupling agents (also known as wetting or adhesion promoters) and/or metal-modified inorganic oxides. Suitable coupling agents include silanes and organometallates such as organic silanes, titanates, and zirconates. Organic titanates and zirconates are well known in the art and are described, for example, in U.S. Pat. No. 6,103,784, which is incorporated herein by reference in its entirety. Suitable metal-modified inorganic oxides include alkaline earth metal-modified silicates, for example, calcium ion exchanged amorphous silica gels such as the SHIELDEX products available from the Grace Davison division of W. R. Grace.

The thermosettable compositions according to the invention can furthermore comprise other usual auxiliary substances and additives, such as e.g., plasticizers, reactive diluents, rheology auxiliaries, wetting agents, adhesion promoters, anti-ageing agents, stabilizers and/or pigments. The ratios of the amounts of the individual components can vary within relatively wide limits according to the requirements profile of the laminated body in respect of its processing properties, the flexibility, the stiffening action required and the adhesive bond to the substrates. Typical ranges for the components of the composition are:

| | | |
|---|---|---|
| (a) | thermoplastic polymer powder | 0.1-40 wt. %, preferably 3-15 wt. %, |
| (b) | liquid epoxy resin | 10-60 wt. %, preferably 30 to 40 wt. %, |
| (c) | reactive diluent | 1-15 wt. %, preferably 1-10 wt. %, |
| (d) | flexibilizing agent | 1 to 25 wt. %, preferably 5 to 15 wt. %, |
| (e) | curing agent and accelerator | 1.5 to 5 wt. %, |
| (f) | blowing agent | 0.1 to 3 wt. %, |
| (g) | lightweight filler | 5-40 wt. %, |
| (h) | fillers | 5-20 wt. %, |
| (i) | fibers | 0-30 wt. %, |
| (j) | pigments, stabilizers, coupling agents | 0-1 wt. %, | the sum of the total constituents being 100 wt. %.

To prepare the compositions according to the invention, the epoxy resin or resins, the flexibilizing agent, the reactive diluent and the thermoplastic polymer together with the fillers, fibers and pigments are homogenized in a conventional mixing unit, such as a planetary mixer, kneader or the like, and the blowing agents and curing agents and accelerators are then mixed in, during which the material temperature should not exceed 110° C., but preferably 60° C. to 90° C., especially during and after the addition of blowing agents and curing agents and/or accelerators. The compositions prepared in this way can be intermediately stored or conveyed directly into the equipment for further processing like an injection molding machine, an extruder or calendering machine.

Depending upon its consistency, flow properties, thixotropic properties, and other characteristics, the expandable thermosettable composition may be shaped by extrusion, by injection molding, by hand, by stamp pressing, by form molding or other means into any desired configuration. If the resin is not readily workable or shapable at room temperature, it may be heated to facilitate the shaping process (provided care is taken not to heat the resin so high as to initiate premature foaming or curing, unless such heating is carried out only shortly before placing the resin into the position or location where structural reinforcement is desired).

To produce the expandable molding, as a rule a carrier is first inserted into the injection mold. This carrier can be made of metal, for example, galvanized steel sheet or aluminum, or also of thermoplastic materials, such as polyamide (PA), polyphenylene sulfide (PPS), polyphenylene ether (PPE), polyphenylene sulfone (PPSU) or polyphenylene-imide (PPI). These carriers of thermoplastic materials can optionally also be fiber-reinforced, and they should be distinguished by a low absorption of water and dimensional stability up to 180° C.

After the mold has been closed, the expandable thermosetting composition, which has been heated to temperatures of between 60° C. and 110° C., preferably 70° C. to 90° C., is injected into the mold, and thereafter cooling of the molding and removal of the molding take place. The binder is of low viscosity at the above-mentioned temperatures and can therefore be conveyed easily via pumps and presses under low pressures. The moldings obtained after cooling are dimensionally stable and are not tacky up to at least 50° C. and require no specifically produced packaging which supports the shape for storage. The shaped articles can therefore be transported to the final user even in summer on long trips in southern countries without the use of refrigerated trucks or refrigerated containers. At the final user, depending on the particular use, the moldings are then either introduced into the hollow space to be stiffened and reinforced, or the moldings can optionally already be attached to the vehicle body components in bare construction such that the hollow space is first formed in the subsequent joining processes by joining further vehicle body components. The moldings according to the invention can furthermore be applied to planar metal sheet components, such as, e.g., wide joints and/or gaps of vehicle body components. As a rule, the moldings have dimensions such that they do not completely fill the hollow spaces or joints and gaps in the non-expanded form, so that further process liquids, such as washing and cleaning baths, phosphating and conversion baths and the electro-dip lacquer, can wet the metallic substrate surface fully. So-called "bare construction ovens" with temperatures of up to 140° C. are occasionally provided in the production lines for pregelling adhesives and sealants, and in this case the moldings according to the invention should not yet expand and cure in the bare construction oven. Only in the subsequent ovens for curing the electro-dip lacquer does expansion of the shaped article by 50 to 100% take place at temperatures of between 110° C. and 200° C., preferably between 140° C. and 180° C., and at the same time the reactive resin matrix of the binder system cures to a thermoset, which then fills the hollow spaces such that it can exert its stiffening and reinforcing action.

The thermosettable compositions of the present invention may be utilized in any end-use application where an adhesive, sealant or coating is required. However, the thermosettable compositions are especially useful in the production of automobiles and other vehicles to maintain or increase the strength of metallic structural members such as rockers, pillars, radiator support beams, doors, reinforcing beams and the like. The use of structural reinforcement foams in such applications is described, for example, in U.S. Pat. Nos. 4,901,500; 4,908,930; 4,751,249; 4,978,562; 4,995,545; 5,124,186; 5,575,526; 5,755,486; 4,923,902; 4,922,596; 4,861,097; 4,732,806; 4,695,343; 4,610,836; 6,068,424; 6,058,673; 6,003,274; 5,992,923; 5,888,600; 6,092,864; 6,079,180 and 5,884,960 (each of which is incorporated herein by reference in its entirety).

The thermosettable compositions of the present invention are also very useful for the production of laminated bodies for stiffening and reinforcing of flat structural components, in particular vehicle body structural components, such as vehicle body frames, doors, trunk lids, engine hoods and/or roof components in automobile construction.

The invention is to be illustrated in more detail in the following embodiment examples, where the choice of examples is not intended to represent a limitation of the scope of the subject matter of the invention, and is merely intended to represent individual embodiments and advantageous effects of the invention by way of a model.

Unless stated otherwise, all the amounts of constituents of the compositions given in the following examples are parts by weight or percentage by weight.

EXAMPLES

Examples 1-5

Expandable thermosettable compositions in accordance with the invention were prepared using the following components shown in Table B. The components are blended together at a temperature of about 50° C.

TABLE 1

Composition of Examples

| | Example 1 (wt %) | Example 2 (wt %) | Example 3 (wt %) | Example 4 (wt %) | Example 5 (wt %) |
|---|---|---|---|---|---|
| Epoxy Resin[1] | 53.35 | 58.35 | 61.51 | 57.85 | 60.22 |
| Thermoplastic Polymer Powder[2] | 7.00 | 7.00 | 3.63 | 3.50 | 3.61 |
| Nitrile Rubber[3] | — | — | — | 5.00 | — |
| Heat Transfer Fluid[4] | 5.00 | — | — | — | — |
| Titanate Coupling Agent[5] | 0.50 | 0.50 | 0.52 | 0.50 | 0.52 |
| Blowing Agent[6] | 1.00 | 1.00 | 1.04 | 1.00 | 1.03 |
| Glass Microspheres[7] | 21.60 | 21.60 | 22.38 | 21.60 | 22.29 |
| Carbon Black Colorant[8] | 0.05 | 0.05 | 0.05 | 0.05 | 0.05 |
| Amine-Epoxy Adduct Curative[9] | 0.60 | 0.60 | 0.62 | 0.60 | 2.06 |
| Dicyandiamide Curative[10] | 3.50 | 3.50 | 3.63 | 3.50 | 3.61 |
| Blowing Agent Accelerator[11] | 0.20 | 0.20 | 0.21 | 0.20 | 0.21 |
| Fumed Silica[12] | 1.00 | 1.00 | 1.04 | 1.00 | 1.03 |
| Aramid Fiber[13] | 0.50 | 0.50 | 0.52 | 0.50 | 0.52 |
| Calcium Carbonate[14] | 4.70 | 4.70 | 4.87 | 4.70 | 4.85 |

[1]PEP 6134 HH from Peninsula Polymer.
[2]DEGALAN 4899F from Röhm America, Inc.
[3]NIPOL 1312 from Zeon.
[4]MARLOTHERM from Sasol North America.
[5]KR 55 from Kenrich Petrochemicals.
[6]CELOGEN 780 from Uniroyal.

TABLE 1-continued

Composition of Examples

|  | Example 1 (wt %) | Example 2 (wt %) | Example 3 (wt %) | Example 4 (wt %) | Example 5 (wt %) |
|---|---|---|---|---|---|

[7]SCOTCHLITE VS5500 from 3M.
[8]MONARCH 120 from Cabot Chemical.
[9]AJICURE PN-40 from Ajinomoto.
[10]AMICURE CG325 from Air Products.
[11]BIK-OT from Uniroyal.
[12]CAB-O-SIL TS-720 from Cabot Chemical.
[13]KEVLAR from Dupont.
[14]ULTRA-PFLEX from Specialty Minerals.

TABLE 2

Measured Properties of Examples 1-5.

|  | Example 1 (350° F. cure) | Example 2 (350° F. cure) | Example 3 (350° F. cure) | Example 4 (350° F. cure) | Example 5 (275° F. cure) | Example 5 (350° F. cure) |
|---|---|---|---|---|---|---|
| EXPANSION |  |  |  |  |  |  |
| Sp. Gravity (uncured) | 0.79 | 0.85 | 0.76 | 0.82 | 0.81 | 0.81 |
| Sp. Gravity (cured) | 0.28 | 0.28 | 0.52 | 0.37 | 0.42 | 0.41 |
| Expansion | 180% | 204% | 45% | 125% | 92% | 99% |
| COMPRESSION |  |  |  |  |  |  |
| Strength (MPa) | 20.6 | 15.7 | 41.9 | 27.7 | 31.8 | 28.1 |
| Modulus (MPa) | 1226 | 979 | 1829 | 1307 | 1414 | 1528 |
| Lap Shear Strength (MPa) | 2.95 ± 0.28 | 2.94 ± 0.11 | 2.49 ± 0.21 | 2.60 ± 0.19 | 1.70 ± 0.26 | 2.10 ± 0.16 |

To simulate injection molding, the example compositions described above were each pregelled for 5 minutes, which corresponds to the pregelling which takes place in the injection mold of an injection molding machine. After pregelling, the example compositions were dimensionally stable and had a non-tacky surface. To determine the degree of blowing (expansion), the density in the cured state, the compressive strength, and the shear strength of the cured article, the articles were cured for 30 minutes at a temperature from about 135 to about 150° C. As shown in Table 2 above, a high degree of expansion and excellent compressive and tensile shear strength were obtained with the composition according to the present invention. Therefore, the materials are well-suited for reinforcing hollow structural members.

Example 6

The components shown below were combined to provide an expandable thermosettable composition in accordance with the present invention:

| Component | Weight % |
|---|---|
| Epoxy Resin[1] | 55.2 |
| Blowing Agent[2] | 2.0 |
| Wollastonite[3] | 3.9 |
| Chopped Glass Fibers | 2.0 |
| KEVLAR Fibers | 0.1 |
| Fumed Silica[4] | 1.0 |
| Curative A[5] | 3.0 |
| Curative B[6] | 0.9 |
| Calcium Carbonate[7] | 5.2 |
| Glass Microspheres[8] | 21.7 |
| Thermoplastic Polymer Powder[9] | 4.9 |

[1]PEP 6134H, Peninsula Polymers
[2]CELOGEN 780 azodicarbonamide, Uniroyal Chemical Company
[3]NYAD G, Nyco Minerals, Inc.
[4]CAB-O-SIL TS720, Cabot Chemical
[5]AMICURE CG-325 dicyandiamide, Air Products & Chemicals
[6]AJICURE PN-40 amine-epoxy adduct, Ajinomoto
[7]ULTRA-PFLEX, Specialty Minerals
[8]SCOTCHLITE VS 5500, 3M
[9]DEGALAN 4899F core/shell spray-dried emulsion powder, Roehm America, Inc.

Three small portions (weighing about 5 g each) of the thermosettable composition were aged for 2 hours at 80 degrees C., then baked at 176 degrees C. for 30 minutes. The average density of the uncured thermosettable composition samples was 0.839 g/cc, while the average density of the cured thermosettable composition samples was 0.352 g/cc (139% expansion, on average). When the amount of the blowing agent was increased to 3.5 weight %, 120% expansion on average was observed. By way of comparison, another thermosettable composition was prepared as described above, except that DEGALAN 4858 (obtained from Roehm America, Inc.) was substituted for the DEGALAN 4899F. DEGALAN 4858 is a spray-dried emulsion believed to have a composition similar to that of the core of DEGALAN 4899F (i.e., DEGALAN 4858 does not have a core-shell structure). When this substitution was made, only 32% expansion on average was observed at a blowing agent level of 2.0 weight %. At a blowing agent level of 3.5 weight %, only 42% expansion on average was observed. These tests demonstrate the advantages of using a thermoplastic polymer powder having a core-shell structure in the expandable thermosettable compositions of the present invention. That is, the amount of expansion is much greater when a core-shell thermoplastic polymer powder is utilized.

Examples 7-12

The constituents of the compositions listed in the following table were mixed in a planetary mixer, which can be evacuated, until the mixture was homogenous, during which it was ensured that the material temperature did not exceed 50° C.

TABLE 3

|  | 7 | 8 | 9 | 10 | 11 | 12 |
|---|---|---|---|---|---|---|
| Epoxy resin, liquid[1] | 55 | 55 | 55 | 55 | — | 55 |
| Glycidyl ether[2] | — | — | 5 | — | 10 | — |
| Epoxy resin, solid[3] | — | — | — | — | 55 | — |
| Core-shell acrylate[4] | 25 | — | — | — | — | — |
| Polyacrylate[5] | — | 25 | — | — | — | — |
| Polyacrylate[6] | — | — | 25 | 25 | 15 | 0 |
| Hollow microbeads[7] | 2 | 2 | 2 | 2 | 2 | 2 |
| Dicyandiamide | 3 | 3 | 4 | 4 | 4 | 4 |
| Amine adduct[8] | 1.5 | 0.8 | 1 | 1 | 1 | 1 |
| Calcium carbonate[9] | — | 4.3 | — | 3 | 3 | 3 |
| Glass fiber[10] | — | — | — | — | — | 20 |
| Glass hollow beads[11] | 13.5 | 10 | 9 | 10 | — | — |
| Gelling temperature ° C. | — | 102 | 84 | — | — | — |
| Gelling time (at 100° C.) sec | — | — | 8 | — | — | — |
| Density, gelled (g/cm$^3$) | — | 0.987 | 0.957 | — | — | — |
| Density, cured (g/cm$^3$) | — | 0.509 | 0.612 | — | — | — |
| Degree of blowing | — | 94 | 57 | — | — | — |
| Compressive strength N/mm$^2$ | 23.6 | 12.8 | 17.7 | — | — | — |
| Tensile shear strength N/mm | — | 3.9 | 3.2 | — | — | — |

Notes for Table 3:
[1]Liquid epoxy resin based on DGBA, epoxide equivalent 250
[2]Monoglycidyl ether of a C12-/C14-alcohol, epoxide equivalent 314
[3]Solid epoxy resin, molecular weight about 880, melting range 50 to 62° C., epoxide equivalent 475
[4]In accordance with the doctrine of U.S. Pat. No. 5290857
[5]Pulverulent polymethyl methacrylate, Tg 124° C.
[6]MMA/butyl methacrylate copolymer
[7]Blowing agent (hollow beads of plastic "EXPANCEL DU 140", Pierce & Stevens)
[8]Finely ground accelerator (amino adduct on epoxy resin with epoxide and tertiary amino groups)
[9]Precipitated
[10]Short fibers, 17 μm fiber diameter, 3 mm long
[11]Hollow glass microbeads (SCOTCHLITE VS 5500, compressive strength approx. 38 MPA, 3M)

To simulate injection molding, the compositions 7-12 were in each case pregelled for 5 min at 110° C., which corresponds to the pregelling in the injection mold of an injection molding machine. After this pregelling, the test specimens were dimensionally stable and had a non-tacky surface. To determine the degree of blowing, the density in the cured state, the compressive strength of the shaped article and the shear strength, the moldings were stoved for 38 min at 150° C. As can be seen from the test results in the above table, good degrees of blowing and excellent compressive strength and tensile shear strength were achieved with the moldings according to the invention. These materials are therefore excellently suitable for stiffening and reinforcing hollow structures in the automobile sector.

Examples 13-14

The constituents of the compositions of examples 13 and 14 listed below were mixed in a laboratory kneader, which can be evacuated, until the mixture was homogeneous, during which it was ensured that the material temperature did not exceed 50° C.

TABLE 4

|  | 13 | 14 |
|---|---|---|
| Epoxy resin, liquid[1] | 55% | 46% |
| Glycidyl ether[2] | 7% | 5.8% |
| Core/shell acrylate[3] | 10% | 8.3% |
| Physical blowing agent[4] | 2% | 1.7% |
| Dicyandiamide | 4% | 3.3% |
| Amine adduct[5] | 1% | 0.8% |
| Calcium carbonate[6] | 7% | 5.8% |
| Glass fibers[7] | — | 16.7% |
| Hollow glass beads[8] | 14% | 11.6% |

[1]liquid epoxy resin based on DGBA, epoxide equivalent 250
[2]monoglycidyl ether of a C12-/C14-alcohol, epoxide equivalent 314
[3]copolymer based on methyl methacrylate/butyl methacrylate, Tg 95° C.
[4]hollow beads of plastic "EXPANCEL DU 140", Pierce & Stevens
[5]finely powdered accelerator with epoxide and tertiary amino groups
[6]precipitated
[7]short fibers, 17 μm diameter, 3 mm long
[8]SCOTCHLITE VS 5500, compressive strength 38 MPa, 3M Laminated bodies with a laminated body layer thickness of 1.2 and 4 mm were shaped from the composition according to example 14 and the strength thereof was measured, the pregelling conditions being 5 min at 90° C.

For a 3-point bending test (in accordance with DIN 53293 or EN 63), test specimens with the test specimen dimensions 120 mm×25 mm×2.8 mm (non-foamed) were produced and were applied to an ELO metal sheet 0.8 mm thick. After stoving at 150° C. for 38 min, the stiffening performance was measured, the measurement results being shown in the following table 5. As can be seen from the results, the pregelled test specimens have an outstanding strength for handling. Furthermore, a very good stiffening performance of the laminated bodies according to the invention results compared with non-reinforced ELO sheet.

TABLE 5

|  | Strength in N after | | | Stiffening performance[2] |
|---|---|---|---|---|
|  | 1 mm | 2 mm | 3 mm | |
| None[1] | 40.7 | 83.8 | 88.4 | 2.8-fold |
| Porcher 3697[1] | 64.8 | 153.9 | 330.0 | 4.5-fold |
| G + L EE 201[1] | 91.7 | 183.0 | 302.7 | 6.3-fold |

[1]glass fiber fabric
[2]compared with 0.8 mm ELO sheet

While the invention has been particularly shown and described with reference to preferred embodiments thereof, it will be understood by those skilled in the art that various changes in form and details may be made without departing from the spirit and scope of the invention as defined in the appended claims.

What is claimed is:

1. An expandable thermosettable composition comprising:
   (a) at least one epoxy resin;
   (b) at least one finely divided thermoplastic polymer powder having a core-shell structure and having a core comprising a reactive thermoplastic containing imidazole functional groups and a shell comprising a non-reactive thermoplastic;
   (c) at least one blowing agent;
   (d) at least one curative; and
   (e) at least one filler.

2. The expandable thermosettable composition of claim 1, comprising additionally a flexibilizing agent.

3. The expandable thermosettable composition of claim 1, comprising additionally a reactive diluent.

4. The expandable thermosettable composition of claim 1, wherein at least one epoxy resin has a molecular weight of greater than 350.

5. The expandable thermosettable composition of claim 1, wherein at least one epoxy resin is a liquid glycidyl ether of a polyhydric phenol.

6. The expandable thermosettable composition of claim 1, wherein said at least one thermoplastic polymer powder has an average particle size of less than 100 µm.

7. The expandable thermosettable composition of claim 1, wherein the thermoplastic polymer powder is present in an amount from 0.1 wt % to 40 wt %.

8. The expandable thermosettable composition of claim 1, wherein said shell has a glass transition temperature of from 70° C. to 120° C.

9. The expandable thermosettable composition of claim 1, comprising at least one curative selected from the group consisting of guanidines, substituted guanidines, substituted ureas, melamine resins, guanamine derivatives, cyclic tertiary amines, aromatic amines, and adducts of amines on epoxy resins.

10. The expandable thermosettable composition of claim 1, comprising at least one chemical blowing agent selected from the group consisting of azobisisobutyronitrile, azodicarbonamide, di-nitroso-pentamethylenetetramine, 4,4'-oxybis (benzenesulfonic acid hydrazide), diphenyl-sulfone-3,3'-disulfohydrazide, benzene-1,3-disulfohydrazide and p-toluenesulfonyl semicarbazide.

11. The expandable thermosettable composition of claim 1, comprising at least one lightweight filler selected from the group consisting of hollow metal beads, hollow glass beads, fly ash, hollow beads of plastic based on phenolic resins, epoxy resins or polyesters, hollow microbeads with a wall material selected from the group consisting of (meth)acrylic acid ester copolymers, polystyrene, styrene/(meth)acrylate copolymers, polyvinylidene chloride and copolymers of vinylidene chloride with acrylonitrile and/or (meth)acrylic acid esters, hollow ceramic beads, and organic lightweight fillers of natural origin.

12. The expandable thermosettable composition of claim 1, comprising additionally one or more types of fibers selected from the group consisting of aramid fibers, carbon fibers, metal fibers, glass fibers, polyamide fibers, polyethylene fibers and polyester fibers.

13. The expandable thermosettable composition of claim 1, comprising

| | | |
|---|---|---|
| (a) | thermoplastic polymer powder(s) | 0.1-40 wt. %; |
| (b) | liquid epoxy resin(s) | 10-60 wt. %; |
| (c) | reactive diluent(s) | 1-15 wt. %; |
| (d) | curing agent(s) and accelerator(s) | 1.5 to 5 wt. %; |
| (e) | blowing agent(s) | 0.1 to 3 wt. %; |
| (f) | lightweight filler(s) | 5-40 wt. %; |
| (g) | filler(s) other than lightweight fillers | 5-20 wt. %; |
| (h) | fiber(s) | 0-30 wt. %; |
| (i) | pigment(s) | 0-1 wt. %; | the sum of the total constituents being 100 wt. %.

14. The expandable thermosettable composition of claim 1, wherein said at least one thermoplastic polymer powder comprises 3 to 15 weight % of the expandable thermosettable composition.

15. A process for stiffening and/or reinforcing a metallic substrate, comprising the steps of:
a) applying a laminate body comprised of a first layer comprised of the expandable thermosettable composition of claim 1 and a second layer comprised of at least one reinforcing agent onto said metallic substrate; and
b) heating the laminate body to a temperature effective to cause foaming and curing of the expandable thermosettable composition.

16. The process of claim 15 wherein said first layer is tacky on at least one side at room temperature and can be stacked without a change in dimensions and shape at temperatures of up to 50°C.

17. The process of claim 15 wherein the metallic substrate is a vehicle body structural component selected from the group consisting of frames, doors, trunk lids, engine hoods and roofs.

18. The process of claim 15 wherein said second layer is comprised of a textile sheet like structure or a metal tape.

19. A process for stiffening and/or reinforcing a structural component having a hollow space or metallic substrate therein, said process comprising:
a) injection molding the expandable thermosettable composition of claim 1 to form a molding;
b) fixing the molding to the metallic substrate or introducing the molding into the hollow space; and
c) heating the molding to a temperature effective to cause foaming and curing of the expandable thermosettable composition.

20. The process of claim 19, wherein said molding is not tacky at room temperature.

21. The process of claim 19, wherein said expandable thermosettable composition is injection molded onto a carrier.

22. A laminate body comprised of a first layer comprised of the expandable thermosettable composition of claim 1 and a second layer comprised of at least one reinforcing agent.

23. A molding comprised of the expandable thermosettable composition of claim 1 and a carrier.

24. An article comprised of a molding of an expandable thermosettable composition in accordance with claim 1 injection molded onto a carrier, wherein said molding is not tacky and dimensionally stable at room temperature.

25. A process for stiffening and/or reinforcing a structural component having a hollow space or metallic substrate therein, said process comprising:
a) fixing an article in accordance with claim 24 to the metallic substrate or introducing the article into the hollow space; and
b) heating the molding to a temperature effective to cause foaming and curing of the expandable thermosettable composition.

* * * * *